(12) United States Patent
Grubba et al.

(10) Patent No.: US 7,455,476 B2
(45) Date of Patent: Nov. 25, 2008

(54) METHOD OF RECONSTRUCTING A BITUMINOUS-SURFACED PAVEMENT

(75) Inventors: Bill Grubba, Terre Haute, IN (US); Todd Thomas, Bel Aire, KS (US)

(73) Assignee: KMC Enterprises, Inc., Tulsa, OK (US)

( * ) Notice: Subject to any disclaimer, the term of this patent is extended or adjusted under 35 U.S.C. 154(b) by 0 days.

(21) Appl. No.: 10/741,024

(22) Filed: Dec. 18, 2003

(65) Prior Publication Data

US 2005/0135879 A1 Jun. 23, 2005

(51) Int. Cl.
*G01M 19/00* (2006.01)
(52) U.S. Cl. .......................... 404/75; 73/146
(58) Field of Classification Search ............... 404/72, 404/75, 76; 73/146
See application file for complete search history.

(56) References Cited

U.S. PATENT DOCUMENTS

| | | | | |
|---|---|---|---|---|
| 2,702,266 A * | 2/1955 | Kalinowski | ................ | 208/23 |
| 3,598,027 A | 8/1971 | Swisher, Jr. | | |
| 3,732,023 A | 5/1973 | Rank et al. | | |
| 3,970,404 A | 7/1976 | Benedetti | | |
| 4,373,961 A | 2/1983 | Stone | | |
| 4,453,856 A | 6/1984 | Chiostri et al. | | |
| 4,473,320 A | 9/1984 | Register | | |
| 4,549,834 A | 10/1985 | Allen | | |
| 4,793,730 A | 12/1988 | Butch | | |
| 4,839,404 A * | 6/1989 | Chang et al. | ................ | 524/69 |
| 4,944,631 A | 7/1990 | Egli | | |
| 4,946,307 A | 8/1990 | Jakob | | |
| 4,974,993 A | 12/1990 | Crabbi | | |
| 5,114,483 A | 5/1992 | Graf | | |
| 5,405,440 A * | 4/1995 | Green et al. | ............ | 106/281.1 |
| 5,618,862 A | 4/1997 | Germanaud et al. | | |
| 5,741,085 A | 4/1998 | Wirtgen | | |
| 5,766,333 A | 6/1998 | Lukens | | |
| 5,817,946 A | 10/1998 | Brovold | | |
| 5,893,677 A | 4/1999 | Haehn et al. | | |
| 5,895,347 A | 4/1999 | Doyle | | |
| 5,921,706 A * | 7/1999 | Manatt et al. | ................ | 404/72 |
| 6,000,876 A | 12/1999 | Shen et al. | | |
| 6,004,076 A | 12/1999 | Cook et al. | | |
| 6,089,783 A | 7/2000 | Goacolou | | |
| 6,139,612 A | 10/2000 | Kitagawa et al. | | |
| 6,158,920 A | 12/2000 | Malot | | |
| 6,159,279 A | 12/2000 | Malot et al. | | |
| 6,176,551 B1 | 1/2001 | Page | | |
| 6,186,700 B1 | 2/2001 | Omann | | |
| 6,220,782 B1 | 4/2001 | Yates | | |
| 6,380,284 B1 | 4/2002 | Lopez | | |
| 6,387,175 B1 | 5/2002 | Lynn et al. | | |
| 6,408,683 B2 * | 6/2002 | Bahia et al. | ................ | 73/54.01 |
| 6,599,057 B2 * | 7/2003 | Thomas et al. | ................ | 404/72 |
| 6,830,408 B1 * | 12/2004 | Blankenship et al. | ......... | 404/17 |
| 2002/0197109 A1 | 12/2002 | Grubba et al. | | |
| 2003/0113163 A1 | 6/2003 | Thomas et al. | | |

FOREIGN PATENT DOCUMENTS

| | | |
|---|---|---|
| EP | 0 274 920 A1 | 7/1988 |
| EP | 0 324 491 A1 | 7/1989 |
| WO | WO 98/54263 | 12/1998 |

OTHER PUBLICATIONS www.aema.org.*
Koch Pavement Solutions, Arizona Millings Evaluation, US-191 Millings, Phoenix, AZ, Apr. 6, 2000.
Minnesota Technology Transfer Program, Technology Exchange Newsletter, Regents of the University of Minnesota, 1999, Cold In-Place Recycling Offers Benefits.
Holtz and Kovacs, An Introduction to Geotechnical Engineering, 1981, pp. 1-4.
Wright and Ashford, Transportation Engineering, 1989, pp. 405-408.
Wirtgen Cold Recycling Manual, Nov. 1998.
Cohesiometer Goes from Hot to Cold, *Asphalt Contractor*, Jul. 2001.

* cited by examiner

*Primary Examiner*—Gary S Hartmann
(74) *Attorney, Agent, or Firm*—Head, Johnson & Kachigian, P.C.

(57) ABSTRACT

A method of reconstructing a bituminous-surfaced pavement is provided. This method includes evaluating the pavement to determine if it is an appropriate candidate for full-depth reclamation; mixing an emulsion with reclaimed asphalt pavement particles from the pavement to form an asphalt emulsion mix; and testing the asphalt emulsion mix for performance using a cohesion test, a moisture susceptibility test, and a modulus test. In many instances, dirt and/or aggregate from the base layer of the pavement are also included in the asphalt emulsion mix. The invention also includes designing a full-depth reclamation (FDR) layer based on this test data. Once the layer is designed, the bituminous surface of the pavement is pulverized, an emulsion is mixed with the pulverized reclaimed asphalt pavement particles from the bituminous surface and possibly dirt and/or aggregate from beneath the bituminous surface of the pavement, and this mixture is applied to the pavement.

10 Claims, No Drawings

METHOD OF RECONSTRUCTING A BITUMINOUS-SURFACED PAVEMENT

CROSS-REFERENCE TO RELATED APPLICATIONS

Not Applicable.

STATEMENT REGARDING FEDERALLY SPONSORED RESEARCH OR DEVELOPMENT

Not Applicable.

BACKGROUND OF THE INVENTION

The present invention relates to reconstructing bituminous-surfaced pavement. More specifically, the present invention is a method for reconstructing a pavement using components from the existing pavement rather than removing and replacing them.

Traditionally, when roads are rehabilitated, material is milled and removed. Then, hot mix asphalt (HMA) is brought to the construction site and placed on the milled area. One disadvantage with such a process is that it is time consuming because it requires two operations. In one operation, the road is milled up, and the material is removed. Then, in the second operation, the hot mix asphalt is transported to the site and placed on the roadway. Another disadvantage with such a process is that the milled material is often not reused.

More recently, roads that are in fair or poor condition have been replaced or rehabilitated using full-depth reclamation (FDR) of the bituminous material that makes up the road. However, these FDR processes lack thorough designs and thus have consistency problems, such as inconsistency in emulsion content. Many times they do not provide the desired performance. Still further, roads made with conventional FDR processes are unreliable, and many times this leads to raveling, pot holes, rutting, disintegration problems, and cracks.

In order to overcome these disadvantages, a method for designing and building a new roadway using in-place materials from the existing roadway is provided. This process provides better road performance while using recycled materials.

BRIEF SUMMARY OF THE INVENTION

It is an object of the present invention to provide a systematic method of reconstructing a bituminous-surfaced pavement that uses materials currently in the pavement so that cost savings for materials are realized and time for moving the materials is reduced.

According to the present invention, the foregoing and the other objects are achieved by an improved method of reconstructing a bituminous-surfaced pavement. This method includes evaluating the pavement to determine if it is an appropriate candidate for full-depth reclamation; mixing an emulsion with reclaimed asphalt pavement (RAP) particles from the pavement to form an asphalt emulsion mix; and testing the asphalt emulsion mix for performance using a cohesion test, a moisture susceptibility test, and a modulus test. In most instances, dirt and/or aggregate from the pavement are also included in the asphalt emulsion mix. The invention also includes designing a full-depth reclamation (FDR) layer based on this test data. Once the layer is designed, the bituminous-surfaced pavement is pulverized, an emulsion is mixed with the RAP particles from the pavement and possibly dirt and/or aggregate from beneath the bituminous surface of the pavement, and this mixture is applied to the pavement.

DETAILED DESCRIPTION OF PREFERRED EMBODIMENT

The bituminous-surfaced pavement reconstruction process of the present invention should be considered when a pavement surface is at the end of its serviceable life or when a pavement needs to be upgraded to carry additional traffic. Bituminous-surfaced pavement includes a bituminous surface, a base layer, and a subgrade layer. When pavement exhibits significant distresses such as alligator (fatigue) cracking, thermal cracks, raveling and potholes, ruts, flushing or bleeding, low skid resistance, or a rough texture, the FDR process of the present invention may be desirable. It may be especially desirable where there are low clearances on bridges and overpasses or where curb heights are a concern. It may be used on rural roads, interstate highways, intrastate highways, airfield pavements including but not limited to airport runways and taxiways, parking lots, and other asphalt surfaces that need rehabilitation. It is especially useful on distressed pavement that is about 12-25 years old.

The particular design of the FDR layer should be based on the process and conditions outlined below, which are part of the present invention. The present invention addresses problems that occur with conventional FDR processes such as raveling, thermal cracking, slow curing times, and unreliable performance. The FDR method of the present invention provides full-depth rehabilitation of significantly distressed pavement that has a structurally sound subgrade and good drainage. The FDR method of the present invention also provides a way to efficiently and effectively increase the load bearing capacity of any pavement, whether distressed or in good condition, that is in need of carrying greater loads. The process of the present invention is especially desirable for reconstructing a roadway.

First, the roadway is evaluated to see if it is an appropriate candidate for full-depth reclamation. The roadway must have a structurally sound subgrade layer. The strength of the subgrade layer may be measured by testing the roadway with a Dynamic Cone Penetrometer (DCP) or a falling weight deflectometer (FWD) or measuring the California Bearing Ratio (CBR) or R-value of the roadway. Preferably, strength measurements are taken at or about each half-mile, and the surface is proof-rolled.

In addition, the roadway is evaluated to determine the overall viability of doing the process. This evaluation includes inspecting traffic levels, geometries, drainage, culverts, road history, and distressed areas. Next, the condition of the roadway is evaluated more thoroughly, preferably during spring thaw or a rainy season. This is when the most water is in the road base layer and subgrade layer. Soil type, cleanliness, gradation, rock base strength and thickness of the roadway are also measured. Preferably, these measurements are based on the top 4-8 inches in depth of the roadway, which may or may not include the base and subgrade layers. Typical cleanliness tests such as a sand equivalence test, a washed gradation test, methylene blue test, and/or plasticity index test can be conducted. The required thickness of the roadway needed to support the traffic is then determined from its bearing capacity and its traffic levels. Following this, it is decided whether the roadway is an appropriate candidate for the FDR process of the present invention.

After the roadway is evaluated, the FDR process of the present invention involves making a preconstruction mix design using materials obtained directly from the project site. Representative samples are obtained from the areas of pavement to be recycled to evaluate the existing pavement. Preferably, the samples taken are distributed throughout the project length, including where differences in the pavement are noticed or measured. These samples usually are in the form of cores of the bituminous surface and loose base materials. Loose base may include, but is not limited to, aggregate, dirt, soil, sand, reclaimed asphalt pavement (RAP) particles, or combinations thereof. However, the samples need to include loose base materials only if the base materials below the bituminous surface are to be reclaimed when rehabilitating the roadway. The pavement samples shall be pulverized, crushed, sized, and/or screened to form reclaimed asphalt pavement particles. The loose base, if obtained, is then incorporated into the RAP. "Reclaimed material" shall refer to the materials obtained for reuse in the FDR process and shall include both RAP alone where base materials are not used and mixtures of RAP and base materials. The reclaimed material is considered black rock or aggregate for purposes of further mix design. If the samples show significant differences in various areas, such as different types or thickness of layers, then separate mix designs shall be performed for each of these pavement segments. The RAP should meet the gradation shown in TABLE 1 prior to mixing with the loose base material and/or the addition of asphalt emulsion:

TABLE 1

| Sieve Size Inches | % passing through |
| --- | --- |
| 1.25" | 100 |
| 0.187" (No. 4) | 28-38 |
| 0.0234" (No. 30) | 4-10 |
| 0.0029" (No. 200) | >0.1 |

A mix shall be designed using the reclaimed material. Mix design includes defining proportions of pulverized bituminous surface to base material and selecting the amount and composition of the emulsion. The process of the present invention includes making specimens of the asphalt emulsion mix and measuring their physical properties before determining the mix composition for use in creating the FDR layer.

In making the specimens, an asphalt emulsion is incorporated into the reclaimed material. The type or formulation of asphalt emulsion used shall be partly determined by the climate in which the emulsion is used, the temperature at which it is placed, and the cleanliness of the reclaimed material. It also may be chosen, for example, to improve coating of the reclaimed material or to adjust breaking properties. Preferably, the mixture cold temperature cracking specification shall be chosen using data from FHWA LTPP Bind™ software (version 2.1) by inputting data from the weather station closest to the project. The required temperature for the mix design specification is the coldest temperature at the top of the FDR layer in the pavement structure, using 98% reliability.

The asphalt emulsion is a blend of asphalt, water, emulsifier, and possibly additives. It is liquid at ambient temperature. The specific formulation of the emulsion can vary depending upon the properties to be achieved. For instance, it can be formulated to set up quickly. It also can be formulated to improve the coating of the bituminous material, to result in less cracking of the roadway or to improve the strength of the roadway. The type of asphalt emulsion used shall be determined by the mixture designed, discussed infra.

Preferably, the emulsion includes about 0.5 to 10% by weight emulsifier, about 60-75% by weight asphalt solids, water, and optionally certain additives. Preferably, the emulsion is substantially solventless and water-based. The additives may be about 0.5 to 10% by weight of the emulsion and may include elastomers, plastomers, surfactants, other adhesion agents, and petroleum fractions. Preferably, it includes a maximum of about 0.5% by weight fuel oil. Depending on which additives are used, these additives can be added to the asphalt solids or to the emulsion to make modified asphalts, including polymer modified asphalt. The emulsifier can be anionic, nonionic, amphoteric, or cationic. Most preferably, the emulsifier is cationic. The emulsion is selected based on climate history of the surface and the predicted application temperature of the emulsion.

In making the specimens, the emulsion is added to the reclaimed material. The emulsion should be present in a sufficient quantity that the mixture is not too dry so as to cause raveling but not in such a high quantity that the mixture becomes plastic. The emulsion is usually about 1.5 to 8% by weight of the mixture. Typically, it is about 2.5 to 6.0% by weight of the mixture. The recommended emulsion contents for design mix formulations are about 1.5%, 2.0%, 2.5%, 3.0%, 3.5%, 4.0%, 4.5%, 5.0%, 5.5%, 6.0%, 6.5%, 7.0%, 7.5%, and 8.0% by weight emulsion. Preferably, four emulsion contents are chosen that bracket the estimated recommended emulsion content. Prior to the addition of emulsion, the amount of moisture determined to be necessary during the FDR construction process is added. Typically, no water is added during construction. If any additives are in the mixture, these additives are introduced in a similar manner to how they will be added during field production.

In making specimens for testing, the reclaimed material is thoroughly mixed and additional water is added to the reclaimed material if necessary. Then, the reclaimed material is mixed with the emulsion. Mixing shall occur at approximately ambient temperature. Preferably, the mixing time with the emulsion should not exceed about 60 seconds.

Preferably, the loose asphalt emulsion mix specimens are placed in a 40° C. oven for 30 minutes before compaction. Preferably, each specimen shall be compacted with a Superpave™ gyratory compactor (SGC) in a 150 mm mold at 1.25° external angle, 600 kPa ram pressure, and 30 gyrations. The mold shall not be heated. The specimens are then extruded from the molds immediately after compaction. Preferably, the specimens are placed in a 40° C. forced draft oven with ventilation on its sides and top, typically for 72 hours.

At least three performance tests are conducted on these specimens. They are a cohesion test, a moisture susceptibility test, and a modulus test. Preferably, the performance of the asphalt emulsion mix is also tested using a thermal cracking test and a strength test. These tests determine the performance of the specimens and whether the designed mix is suitable for application.

Preferably, a cohesiometer is used to test the cohesion of the specimens. The objective of the cohesion test is to estimate the short-term curing ability of the specimens. This test is an indicator of how quickly the reclaimed material will cure during the project.

Preferably, the cohesion test is performed according to Sections 10, 11, 12, and 13 of ASTM D 1560 entitled Standard Test Methods for Resistance to Deformation and Cohesion of Bituminous Mixtures by Means of Hveem Apparatus with the following exceptions: the testing device is modified to fit 150 mm diameter specimens, and the loading rate is 2,700 grams per minute. Specimens are prepared as described above except specimens are cured for one hour at 25° C. before testing. The value obtained represents the cohesion of the mixture. Still further, the cohesion value provides information about the raveling potential of the mix.

Preferably, the strength of the specimens is measured using an indirect tensile strength (ITS) test. The objective of this test is to determine the strength of the cured specimens. This test is an indicator of the ultimate strength of the specimen. For the ITS test, preferably, specimens are dried for 72 hours at 40° C. After curing, specimens are cooled at ambient temperature a minimum of about 4 hours and a maximum of about 24 hours. Most preferably, Sections 8.10, 8.11, 8.11.1, and 9 of ASTM D 4867 entitled Standard Test Method for Effect of Moisture on Asphalt Concrete Paving Mixtures are followed with the following exceptions: specimens are prepared as described above, no minimum or maximum amount of air voids in specimens is required, and two specimens are tested for each emulsion content.

The specimen's ability to withstand moisture damage is measured using a moisture susceptibility test. The objective of this test is to determine the strength loss of the specimens with exposure to water and freezing conditioning. For the moisture susceptibility test, the same conditioning and volumetric measures are performed on moisture condition specimens as performed on the specimens used for the ITS test, discussed above. Preferably, Sections 8 and 9 of ASTM D 4867 are followed with the following exceptions: specimens are prepared as described above, no minimum or maximum amount of air voids in specimens is required, two specimens are tested for each emulsion content, and specimens are vacuum saturated to about 55 to 75% of the volume of voids. Preferably, for colder climates, the freeze-thaw procedure of Section 8.7 is followed except the specimens are thawed for about 24 hours in a 25° C. water bath before testing. The average moisture conditioned specimen strength divided by the average dry specimen strength is referred to as retained strength. This is an indicator of stripping and strength loss, which leads to rutting and the formation of potholes. For most FDR layer designs, the retained stability of the FDR layer must be greater or equal to about 50%.

The modulus of the each specimen is measured to evaluate the relative quality of materials as well as to generate data for pavement design or pavement evaluation and analysis. The test is non-destructive. ASTM D 4123, AASHTO TP31, or equivalent methods are performed on specimen diameter or axis. Preferably, the modulus is measured following ASTM D 4123 entitled Standard Test Method for Indirect Tension Test for Resilient Modulus of Bituminous Mixtures with the following exceptions: specimens are prepared as described above, two specimens are tested for each emulsion content, one testing temperature is used, which is 25° C., the loading frequency is 1 Hz, and each specimen is tested for resilient modulus only once. Preferably, this test is performed before and on the same specimens as the ITS test.

An indirect tensile (IDT) test also may be performed on the specimens to test thermal cracking. More specifically, this IDT performance test estimates the cold temperature cracking initiation of the mixture. It predicts the coldest temperature that the mixture can withstand and avoid cracking at the top of the FDR layer. The IDT test is a series of 2 tests, a tensile creep test and a tensile strength test. Preferably, the indirect tensile test is performed according to AASHTO TP9-96, which is the Standard Test Method for Determining the Creep Compliance and Strength of Hot Mix Asphalt (HMA) Using the Indirect Tensile Test Device, with the following exceptions: specimens shall be about 150 mm in diameter and at least about 115 mm in height and compacted to air voids ±1% of the designed air voids of the designed emulsion content. Preferably, test specimens shall be cured at 40° C. for about 72 hours. After curing, two specimens shall be cut from each compacted specimen to about 50 mm in height. A bulk specific gravity test is then performed after cutting.

Preferably, two specimens are the minimum required at each of three temperatures. Three temperatures at about 10° C. intervals that bracket the required specification temperatures are selected. For example, if the required specification temperature is −25° C., then testing temperatures of −20° C. and −30° C. and −10° C. or −40° C. should be selected. The tensile strength test shall be carried out on each specimen directly after the tensile creep test at the same temperature as the creep test. The environmental chamber should be capable of reaching temperatures at least as low as about −40° C.

The critical cracking temperature is defined as the plotted intersection of the calculated pavement thermal stress curve (derived from the creep data) and the tensile strength line (the line connecting the results of the average tensile strength at the three temperatures). To pass this test, the predicted thermal cracking temperature by IDT should meet the requirements defined by the LTPP Bind™ program, at 98% reliability, for the coldest temperature at the top of the FDR layer in the climate in which the project is performed.

If necessary, additives may be used to modify the mix design to meet the desired mixture properties for the FDR layer. Additives, such as lime, additional aggregate, RAP, polymers, fly ash, cement, chemicals such as $CaCl_2$, or combinations thereof may be added to the mix.

If the material being reclaimed significantly varies at different places in the road, then one should attempt to develop mix designs that meet the desired criteria for each of the differing segments of road. For instance, some areas of the road may require higher emulsion contents than others.

Before conducting the FDR process on the bituminous-surfaced pavement, grass and other vegetation shall be removed from the edge of the existing pavement to prevent contamination of the pulverized bituminous material during the reclamation operation.

The existing pavement shall be pulverized to the desired depth and width. Preferably, less than an inch deep of the bituminous surface of the pavement remains on the roadway after it is pulverized. Most preferably, substantially all of the bituminous surface is pulverized along with reclaiming some base material, such as aggregate and dirt, below the bituminous surface. Preferably, about 4 to 12 inches of the depth of the pavement are reclaimed. Preferably, greater than about 2 inches of the reclaimed material are bituminous material. More preferably, about 4 to 8 inches of the depth of the pavement are reclaimed. Most preferably, about 6 to 8 inches of the depth of the pavement are reclaimed. Typically, the composition of the reclaimed material is 20-100% by volume RAP. Preferably, it is 40-100% by volume RAP, and most preferably, it is 60-100% by volume RAP. Samples of pulverized bituminous material shall be obtained about each $\frac{1}{12}^{th}$ of a mile before emulsion addition and screened to determine if the pulverized material meets the maximum particle size requirement of the mix design.

Preferably, a self-propelled reclaiming machine is used to pulverize the existing bituminous material in a single pass to the desired depth. Preferably, the depth being reclaimed is managed during the pulverization process. The reclaimer/pulverizer capability is used to reduce the pavement bituminous material to the desired size while mixing it with the loose base materials and asphalt emulsion. Preferably, all of the pulverized asphalt pavement shall be processed to meet the maximum size requirements in the mix design.

Preferably, a reclaiming unit having water and emulsion metering and proportioning capabilities is used. Preferably, it is coupled with a computer controlled liquid metering device.

The pulverization mixing unit may be either integrated or contained. Preferably, the liquid metering device shall be capable of automatically adjusting the flow of asphalt emulsion to compensate for any variation in the velocity of the pulverizer.

The asphalt emulsion and water shall be incorporated into the pulverized bituminous material at the initial rate determined by the mix design(s). Adjustments in the rate of asphalt emulsion and water are made as necessary based on the coating and breaking properties of the mixture. Sampling and mix design may determine that different levels of asphalt emulsion are needed at various portions of the road.

It is desirable for the asphalt emulsion to be at a temperature no greater than about 120° F. during application. Preferably, it is between about 60° and 120° F. during application.

The FDR mixture exits the mixing chamber and is spread on the road. The mixture is then compacted. Preferably, rollers are used to compact the recycled mixture. Most preferably, compaction is accomplished with a padfoot roller, followed by removing padfoot marks with a motor grader, followed by using a steel roller and a pneumatic roller. After completion of compaction of the recycled material, preferably, no traffic is permitted on the recycled material until it has sufficiently cured.

Another aspect of the present invention is on-sight monitoring of the process. The nominal depth of pulverization shall be checked on both outside vertical faces of the cut about every $1/12^{th}$ mile. The top size of the desired gradation of the mixture is also checked. Preferably, the compaction of the FDR layer is monitored using a density measuring device to verify adequate compaction. Also, the emulsion content of the mixture used to make the FDR layer should be monitored periodically.

The FDR material alone can support traffic prior to placement of a wearing surface thereon. If placing a wearing surface on the FDR, it should be allowed to cure until its moisture is reduced to about 2.5% by weight or less. The wearing surface may be a cold, hot, or warm mix overlay, a sealcoat, a chip seal, a fog seal, or other surface treatment such as concrete. Preferably, a pavement design is performed to determine the appropriate thickness of the wearing surface.

Preferably, the process of the present invention is performed at an ambient temperature of at least about 40° F. Most preferably, the process is performed at an ambient temperature of at least about 50° F. Preferably, no fog or rain is present. Preferably, there are no freezing temperatures within 7 days after placement of any portion of the project.

By designing a full-depth reclamation layer using a cohesion test, a moisture susceptibility test, and a modulus test, a superior pavement layer is created. The full-depth reclamation process of the present invention can remove pavement distress such as cracks and ruts, reestablish crowns, maintain clearances and curb heights, improve poor aggregate gradations, improve pavement quality, be higher quality than the original pavement, re-use existing materials, minimize the need for new materials, minimize lane closure time, and provide a new, better surface. The FDR method of the present invention improves raveling, isolated rutting, consistency in emulsion content, extended curing time, compaction problems, disintegration under traffic, moisture susceptibility, and crack resistance. It is more consistent, more predictable, has improved performance, longer durability, better modulus, more flexibility and better curing than conventional FDR methods.

The FDR process of the present invention also creates more time for application in days per year because the process can be conducted at lower temperatures because the FDR material is compacted and cures quicker than conventional processes. When the FDR material created during the process of the present invention has reached the end of its life cycle, the reclaimed pavement can be recycled itself.

From the foregoing it will be seen that this invention is one well adapted to attain all ends and objectives herein-above set forth, together with the other advantages which are obvious and which are inherent to the invention.

Since many possible embodiments may be made of the invention without departing from the scope thereof, is to be understood that all matters herein set forth are to be interpreted as illustrative, and not in a limiting sense.

While specific embodiments have been shown and discussed, various modifications may of course be made, and the invention is not limited to the specific forms or arrangement of parts and steps described herein, except insofar as such limitations are included in the following claims. Further, it will be understood that certain features and sub-combinations are of utility and may be employed without reference to other features and sub-combinations. This is contemplated by and is within the scope of the claims.

We claim:

1. A method of reconstructing a bituminous-surfaced pavement, comprising:
   creating reclaimed asphalt pavement particles from a bituminous surface;
   mixing a water based asphalt emulsion with 100% said reclaimed asphalt pavement particles to form at least one water based asphalt emulsion mixture;
   testing said at least one water based asphalt emulsion mixture for cohesion and modulus performance; and
   selecting a water based asphalt emulsion mixture for making said reconstructed bituminous surface based on the cohesion and modulus performance of said at least one water based asphalt emulsion mixture.

2. The method of claim 1, wherein said modulus performance is measured by measuring the resilient modulus of said at least one water based asphalt emulsion mixture.

3. The method of claim 1, further comprising:
   testing said at least one water based asphalt emulsion mixture for moisture susceptibility; and
   selecting a water based asphalt emulsion mixture for making said reconstructed bituminous surface based on the moisture susceptibility of said at least one water based asphalt emulsion mixture.

4. The method of claim 3, further comprising:
   testing said at least one water based asphalt emulsion mixture for thermal cracking; and
   selecting a water based asphalt emulsion mixture for making said reconstructed bituminous surface based on the thermal cracking of said at least one water based asphalt emulsion mixture.

5. The method of claim 3, further comprising:
   testing said at least one water based asphalt emulsion mixture for strength; and
   selecting a water based asphalt emulsion mixture for making said reconstructed bituminous surface based on the strength of said at least one water based asphalt emulsion mixture.

6. A method of reconstructing a bituminous-surfaced pavement, comprising:
   creating reclaimed asphalt pavement particles from a bituminous-surface;
   mixing a water based asphalt enitilsion with 100% said reclaimed asphalt pavement particles to form at least one water based asphalt emulsion mixture;

testing said at least one water based asphalt emulsion mixture for cohesion and moisture susceptibility performance; and selecting a water based asphalt emulsion mixture for making said reconstructed bituminous surface based on tin cohesion and moisture susceptibility performance of said at least one water based asphalt emulsion mixture.

7. The method of claim 6, wherein said selected water based asphal emulsion has a retained stability of greater than 50% after undergoing a moisture susceptibility test.

8. The method of claim 7, further comprising:
testing said at least one water based asphalt emulsion mixture for thermal cracking; and
selecting a water base asphalt emulsion mixture for making said reconstructed bituminous surface based on the thermal cracking of said at least one water based asphalt emulsion mixture.

9. The method of claim 7, further comprising:
testing said at least one water based asphalt emulsion mixture for strength; and
selecting a water based asphalt emulsion mixture for making said reconstructed bituminous surface based on the strength of said at least one water based asphalt emulsion mixture.

10. A method of reconstructing a bituminous-surfaced pavement, comprising:

creating reclaimed asphalt pavement particles from a bituminous surface;

mixing at least one water based asphalt emulsion with 100% said reclaimed asphalt pavement particles to form a water based asphalt emulsion mixture;

testing said water based asphalt emulsion mixture for cohesion and moisture susceptibility performance;

selecting a water based asphalt emulsion mixture for making said reconstructed bituminous surface based on the cohesion and moisture susceptibility performance of said at least one water based asphalt emulsion mixture;

preparing a field mixture that comprise said selected water based asphalt emulsion and 100% reclaimed asphalt pavement particles; and applying said field mixture to said surface so as to reconstruct said surface, wherein said surface is able to receive traffic after being applied before a wearing surface is applied.

* * * * *

UNITED STATES PATENT AND TRADEMARK OFFICE
CERTIFICATE OF CORRECTION

| | |
|---|---|
| PATENT NO. | : 7,455,476 B2 |
| APPLICATION NO. | : 10/741024 |
| DATED | : November 25, 2008 |
| INVENTOR(S) | : Bill Grubba and Todd Thomas |

Page 1 of 1

It is certified that error appears in the above-identified patent and that said Letters Patent is hereby corrected as shown below:

Column 8, line 65, change "enitilsion" to --emulsion--;

Column 9, line 5, change "tin" to --the--.

Signed and Sealed this

Twenty-third Day of June, 2009

JOHN DOLL
*Acting Director of the United States Patent and Trademark Office*